US012298723B2

(12) United States Patent
Bernhard et al.

(10) Patent No.: US 12,298,723 B2
(45) Date of Patent: May 13, 2025

(54) CONTROL DEVICE FOR CONTROLLING A TECHNICAL SYSTEM INCLUDING AT LEAST ONE CONTROLLABLE COMPONENT, METHOD FOR OPERATING A CONTROL DEVICE, AND SYSTEM INCLUDING THE CONTROL DEVICE

(71) Applicant: Rolls-Royce Solutions GmbH, Friedrichshafen (DE)

(72) Inventors: Alexander Bernhard, Meckenbeuren (DE); Carsten Schäfer, Ravensburg (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 289 days.

(21) Appl. No.: 17/749,737

(22) Filed: May 20, 2022

(65) Prior Publication Data

US 2022/0276624 A1 Sep. 1, 2022

Related U.S. Application Data

(63) Continuation of application No. PCT/EP2020/082556, filed on Nov. 18, 2020.

(30) Foreign Application Priority Data

Nov. 22, 2019 (DE) ...................... 10 2019 131 632.4

(51) Int. Cl.
G05B 15/02 (2006.01)
(52) U.S. Cl.
CPC .................................... *G05B 15/02* (2013.01)
(58) Field of Classification Search
CPC ......... G05B 15/02; G06Q 50/06; G06Q 10/04
See application file for complete search history.

(56) References Cited

U.S. PATENT DOCUMENTS

| 4,215,412 | A | * | 7/1980 | Bernier | ..................... G07C 3/00 |
| | | | | | 701/100 |
| 2004/0158387 | A1 | * | 8/2004 | Yasui | ................... F02D 41/2477 |
| | | | | | 701/108 |

(Continued)

FOREIGN PATENT DOCUMENTS

| DE | 198 50 051 A1 | | 5/2000 |
| EP | 3035281 A1 | * | 6/2016 |
| JP | 2007077935 A | * | 3/2007 |

OTHER PUBLICATIONS

"Data point selection for piecewise linear curve approximation" B. Hamann et al., Computer Aided Geometrie Design 11 (1994) 289-301 (13 pages).

(Continued)

*Primary Examiner* — Chad G Erdman
(74) *Attorney, Agent, or Firm* — TAYLOR & EDELSTEIN, P.C.

(57) ABSTRACT

A control device includes: a receiving unit, the control device being configured for controlling a technical system including at least one controllable component with respect to a target variable taking into consideration a forecast curve, which is provided with a plurality of values for a plurality of points in time in a future time period by the receiving unit; and an optimizer including an analysis unit configured for analyzing the forecast curve and an approximator configured for specifying an approximated forecast curve, the analysis unit being configured for setting a plurality of supporting points based on analyzed ones of the plurality of values of the forecast curve, and the approximator being configured for specifying the approximated forecast curve with the plurality of supporting points that are set based on the analyzed ones of the plurality of values of the forecast curve.

1 Claim, 6 Drawing Sheets

(56) References Cited

U.S. PATENT DOCUMENTS

2017/0364043 A1* 12/2017 Ganti ................. G05B 17/02
2019/0331043 A1* 10/2019 De Smet ................. F01N 9/00

OTHER PUBLICATIONS

International Search Report and Written Opinion of the International Searching Authority dated Mar. 2, 2021 for International Application No. PCT/EP2020/082556 (12 pages).

* cited by examiner

FIG. 1A
(State of the Art)

FIG. 1B
(State of the Art)

FIG. 4

CONTROL DEVICE FOR CONTROLLING A TECHNICAL SYSTEM INCLUDING AT LEAST ONE CONTROLLABLE COMPONENT, METHOD FOR OPERATING A CONTROL DEVICE, AND SYSTEM INCLUDING THE CONTROL DEVICE

CROSS REFERENCE TO RELATED APPLICATIONS

This is a continuation of PCT application no. PCT/EP2020/082556, entitled "CONTROL DEVICE FOR CONTROLLING A TECHNICAL SYSTEM COMPRISING AT LEAST ONE CONTROLLABLE COMPONENT, METHOD FOR OPERATING A CONTROL DEVICE, AND SYSTEM COMPRISING THE CONTROL DEVICE", filed Nov. 18, 2020, which is incorporated herein by reference. PCT application no. PCT/EP2020/082556 claims priority to German patent application no. 10 2019 131 632.4, filed Nov. 22, 2019, which is incorporated herein by reference.

BACKGROUND OF THE INVENTION

1. Field of the Invention

The present invention relates to a control device for controlling a technical system, and a method for controlling a technical system.

2. Description of the Related Art

The present invention relates to a control device for controlling a technical system, including at least one controllable component with respect to a target variable taking into consideration a forecast curve, wherein the forecast curve is provided with a number of values for points in time in a future time period by a receiving unit, and the component can be controlled on the basis of an approximated forecast curve, wherein supporting points are specified in order to approximate the forecast curve.

The present invention also relates to a method for controlling a technical system with respect to a target variable, taking into consideration a forecast curve, including the following steps:
  receiving a forecast curve in form with a number of values in a future time period,
  determining supporting points for the forecast curve, in order to approximate the forecast curve,
  specifying the approximated forecast curve with the supporting points,
  controlling of components on the basis of the approximated forecast curve.

A control device of the type referred to above for controlling a component of a system with respect to a target value taking into consideration a forecast curve is known to the extent that the forecast curve is provided by a receiving unit with a number of values for points in time in a future period, and the component is controllable on the basis of an approximated forecast curve, wherein supporting points are specified in order to approximate the forecast curve. This means specifically that, in the state of the art, supporting points are specified completely independently of the cause, and in particular regardless of the forecast curve, in order to approximate the forecast curve.

For this purpose a discretization unit is designed to specify a number of usually equidistant supporting points in order to approximate the forecast curve and to specify a forecast curve approximated by way of discretization with the supporting points.

In such known control devices, equidistant time intervals are selected for the equidistant supporting points. The timing for a supporting point relative to an additional supporting point is therefore predetermined in previously known applications of this type. In this respect, to date only a predetermined forecast horizon with often only limited accuracy for approximation is often achieved for a specified number of supporting points.

Controllable components with such discretized forecast curve implemented in the same manner—which is adversely approximated only by way of predetermined and thus independently specified supporting points—can only be controlled to a limited extent in an adaptable manner, taking into account the approximated forecast curve in a future time period in regard to a certain and possibly variable target value, in particular if the approximated forecast curve is created in the form of a progression of values for predetermined equidistant points in time.

In the case of a forecast curve that changes dynamically in reality, a progression of values for predetermined equidistant points in time proves to be comparatively inflexible or respectively still improvable—always in the same manner—for the discretized forecast curve.

It is desirable to make an adaptable control of a technical system with at least one controllable component possible, depending on the forecast curve, in particular to improve the approximated forecast curve for improved controllability of the components in the system. In the case of a specified number of supporting points, an accuracy or a forecast horizon can in particular be further improved with an approximated forecast curve.

What is needed in the art is a control device and a method for controlling a component of a system by way of which at least one of the aforementioned aspects is considered, in particular improved. In particular, what is needed in the art is to make possible—as a function of the forecast curve—an adaptable control for a technical system with at least one controllable component, and in particular to improve the approximated forecast curve for improved controllability of the system components.

SUMMARY OF THE INVENTION

The present invention is based on a control device of the type described above. According to the present invention it is provided that an optimizer includes an analysis unit for analyzing the forecast curve and an approximator for specifying the approximated forecast curve, wherein
  the analysis unit is designed to set the supporting points on the basis of the analyzed values of the forecast curve and
  the approximator is designed to specify the approximated forecast curve using the supporting points that are set on the basis of the analyzed values of the forecast curve.

The present invention is based on the consideration that predetermined supporting points can only prove to be advantageous to the same extent for each changing forecast curve.

The present invention is based on the consideration that predetermined supporting points can only prove to be equally advantageous to a limited extent for every changing forecast curve; in particular, they are not suitable for improved flexible forecasting. The present invention is based in particular on the consideration that a selection of equidistant time steps for the supporting points in at least some cases of an approximated forecast curve permits only a comparatively inaccurate approximation of the actually provided forecast curve.

Specifically this means that the approximated supporting points are set on the basis of the shape of the forecast curve provided and not on the basis of a predefined time interval.

The optimizer includes an analysis unit which analyzes the already provided forecast curve and the supporting points based on the analyzed values of the forecast curve.

The optimizer moreover includes an approximator which gives the approximated forecast curve based on the analyzed values of the forecast curve set points.

On the other hand, the present invention considers that advantageously a high accuracy—that is, a small error between the approximation and the provided forecast curve—should be achievable with a limited number of supporting points and an acceptable computing effort. The present invention has recognized that certainly, the problem mentioned at the beginning in regard to an approximation of the provided forecast curve cannot be solved with a mere increase in the number of supporting points; it was recognized that this is not conducive in the control or a desired fast control of the components, due to an increasing computing effort.

For this reason the present invention provides that supporting points are set based on the analysis of the forecast curve. According to the present invention, not only a better, but above all, a more flexible approximation can be achieved with the set supporting points—in contrast to the forecast curve approximated with predetermined supporting points at equidistant time intervals. Via the thus improved approximation of the provided forecast curve, this results in an improved accuracy compared to the approximation with equidistant time intervals between the supporting points and an improved computing time compared to many supporting points for the approximation.

In particular, one component of the technical system can react more flexibly and accurately to dynamically changing target values within the framework of a control, taking into account a forecast curve for the controllable component, since the approximated forecast curve is developed by way of support points which are set on the basis of the analysis of the forecast curve and is thus selected suitable for the dynamically changing target value or respectively suitable to the problem to be solved in terms of control technology.

According to a further aspect of the present invention, the present invention provides a system having a control device and a technical system for controlling a component of the technical system. The system is intended to control a technical system with the inventive control device. The present invention thus also leads to a system including a control device of the invention and a technical system for controlling a component of the technical system with respect to a target value in consideration of a forecast curve. A control device in accordance with the concept of the present invention can be used in many ways.

According to a further aspect of the present invention, the present invention provides a method for operating a control device for controlling a technical system with respect to a target value, considering a forecast curve.

The method includes the following steps:
receiving a forecast curve in the form of a progression of values in a future time period,
determining of supporting points for the forecast curve, in order to approximate the forecast curve,
specifying the approximated forecast curve with the supporting points,
controlling the component on the basis of the approximated forecast curve.

According to the present invention it is provided that
the supporting points are set on the basis of the analyzed values of the forecast curve, and
the approximated forecast curve is indicated with the supporting points which are set on the basis of the analyzed values of the forecast curve.

The method is optionally implemented with an optimizer which includes an analysis unit for analyzing the forecast curve, and an approximator for specifying the approximated forecast curve, wherein
the analysis unit is designed to set the supporting points on the basis of the analyzed values of the forecast curve, and wherein
the approximator is designed to indicate the approximated forecast curve with the supporting points set on the basis of the analyzed values of the forecast curve.

The approximated forecast curve can be specified as a supporting point optimized forecast curve. The forecast curve is optimized if it is based only on relevant support points for the respective technical system or the controllable component of the technical system. Such relevant points change depending on the requirements of the technical system.

The provided forecast curve can be based on empirical values, a prediction or on values from a neural network. The forecast curve is advantageously related to the component in that the values of the forecast curve influence the control of the component. This means that at a certain point in time, each supporting point specifies a certain value of the target value, which is controlled by the control device and thus serves to control the component. In other words, the approximated forecast curve with the set supporting points, each of which includes a value and a time point, is used to control the components.

Moreover, a prognosis of a component or a subsystem may influence the control of all components in the system and not only of the component itself.

In a further development the analysis unit may be designed to determine characteristic values of the forecast curve on the basis of the analyzed values and to select points in time for the characteristic values of the forecast curve for which the supporting points are set. The characteristic values are significant for control of the system components or for the system itself. For the control of the component, points in time can be significant at which events occur which manifest themselves in changes in the gradient of the forecast curve. These events are defined by the characteristic values and the associated point in time and are indicated as supporting points.

Such characteristic values can be determined advantageously within the scope of a curve discussion of the forecast curve. Thus, the characteristic values can be selected by a curve discussion from a group of characteristic value points of the forecast curve, consisting of: minima, maxima, turning points, interfaces and/or zero crossings of the forecast curve. Other points to be determined in the forecast process can also be selected for characteristic values of the forecast curve, such as zero points or interfaces with other forecast processes or the like. Gradients or gradient changes, or threshold values to all aforementioned characteristic value points can also be used to determine characteristic values. In particular, however, such characteristic values can generally be determined which correlate with significant events with respect to or for a component of the technical system or for the technical system. With such a determination, set points can be set in an improved manner on the basis of the characteristic value and the associated time point, for example for a linear interpolation, so that an approximation represents the calculated forecast curve as accurately as possible, in other words, with a small error between the approximation and the provided forecast curve.

Especially significant for the control unit of a technical system are selected points in time at which the forecast curve develops in a characteristic manner in its progression; this correlates for the most part with significant events in or for a component of the technical system. In this respect the characteristic values can also be determined for such selected instants.

Characteristic values can be selected advantageously in addition or alternatively in such a way, that deviations between the forecast curve and the approximated forecast curve in the form of a supporting point optimized forecast curve are minimized, in particular that by way of a method of the smallest error squares a distance measure is minimized, in particular a distance measure between the forecast curve and the supporting point optimized forecast curve with a linear interpolation of the forecast curve.

In a further development the approximator can be designed to indicate the supporting point optimized forecast curve with an interpolation, in particular a linear interpolation. In numerical mathematics the term "interpolation" refers to a category of problems and methods, wherein for given discrete data a continuous function is to be found that maps this data. Even if supporting points that are set according to the concept of the present invention on the basis of the analyzed values of the forecast curve would already suffice, the interpolation—within the scope of a further development—can nevertheless also realize an optional further developed type of approximation. According to the concept of the present invention, the interpolation function can advantageously reproduce the function in question particularly accurately in the supporting points, and thus in at least a further improved approximate manner at the remaining points.

Thus, in addition to the supporting points set according to the concept of the present invention, additional points of the forecast curve for the control can be used especially advantageously and in an improved manner. In particular, with a linear interpolation of the forecast curve a negligible approximation error of the forecast curve is ensured, thereby making other such points also suitable for the control. A linear interpolation is especially advantageous because it is based on a simple calculation and thus requires little processing power, thereby still further reducing the computing time. In other further developments cuboid or other spline interpolation can also be used.

The approximator can also be designed to indicate the supporting point optimized forecast curve in regard to a predetermined characteristic, in particular accuracy, an extended forecast horizon or another system characteristic.

If the supporting point optimized forecast curve is to be indicated in regard to accuracy, particularly sections of the supporting point optimized forecast curve with rapidly changing gradient may have shorter time intervals between the supporting points. In such a case the horizon of the prognosis may be shorter than the forecast horizon with the assistance of a conventional approximation of the forecast, specifically with equidistant time intervals between the supporting points.

If the supporting point optimized forecast curve is to be specified with regard to an extended forecast horizon, the supporting points usually have longer time intervals than would be the case in a conventional approximation of the forecast, specifically equidistant time intervals between the supporting points.

The supporting point optimized forecast curve can also be specified in regard to another system characteristic. For example, target values such as output in an energy supply network, or emission of an engine can be utilized as system characteristic.

In a further development the analysis unit can be designed to receive a number of supporting points, in particular in the form of an input signal. This makes it possible for example to specify a number of supporting points manually, or via a pre-control or a table or a memory.

The selected points in time of the selected supporting points can be spaced differently from one another in terms of their time intervals. In conventional approximations, fixed and equidistant time intervals are used between the supporting points. In contrast hereto, it is advantageously provided in further development, that the time intervals differ from one another, namely depending on the characteristic values. Characteristic values can reflect events when, for example, a lot of energy has to be supplied from the energy supply network to energy consumers or when energy producers, especially producers of renewable energy, do not provide enough energy. Characteristic values can also be events where a ship enters port and other emission limits must be adhered to. A point in time is assigned to the characteristic values. Together, the characteristic value and the time determine the set point.

The set supporting points can be variable depending on the provided forecast curve, in particular they may be set variable or vary with a change in the provided forecast curve. According to the concept of the present invention, the set supporting points change with a changed forecast curve. In other words, a first forecast curve is provided at a first forecast time and a second forecast curve is provided at a second forecast time, wherein the analysis unit is designed to set first supporting points on the basis of the first forecast curve and the approximator is designed to use the first supporting points to specify a first approximated forecast curve as the supporting point optimized forecast curve, and the analysis unit is designed to set second supporting points on the basis of the second forecast curve and the approximator is designed to use the second supporting points to specify a second approximated forecast curve as the supporting point optimized forecast curve, wherein the first and second set supporting points are different, in particular vary, optionally the first and second points in time for the first and second set supporting points vary depending on the forecast curve.

As a result, a forecast horizon with the set supporting points can be more accurate or may be further in the future. "More accurate" in this context does not exclusively mean that the set supporting points are closer together. The set supporting points are more precise especially, if the provided forecast curve is mapped as precisely as possible by the supporting point optimized forecast curve.

The forecast horizon is further in the future if it predicts further into the future than a forecast horizon with the same number of supporting points which are fixed and are selected in equidistant time intervals/steps.

The analysis unit can advantageously be called up at regular time intervals to set the supporting points; in particular, the approximator can be further designed to call up the analysis unit at regular time intervals to set the supporting points. The analysis unit can be called every 1, 2 or 5 seconds, for example. Thus, the set supporting points can be regularly passed on to the approximator.

A control device according to the concept of the present invention can be used in a variety of applications.

Advantageously, the technical system can be a drive or energy supply system, and the component can be an engine or an energy provider or energy consumer. The target value can be an emission target for the engine or an output in the energy supply system.

For example, for ships or rail vehicles on a given route, the target values may be an emission target, depending on whether they are on the open sea or entering a port. Through improved approximation, the emission standards can be better met.

The target value can also be an output in an energy supply system. Here, for example, a power output to energy consumers from the energy supply system and a power feed from the energy producers into the energy supply system is approximated. Through improved approximation, a power output to energy consumers and a power feed from the energy producers can for example be better coordinated with each other.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1A:
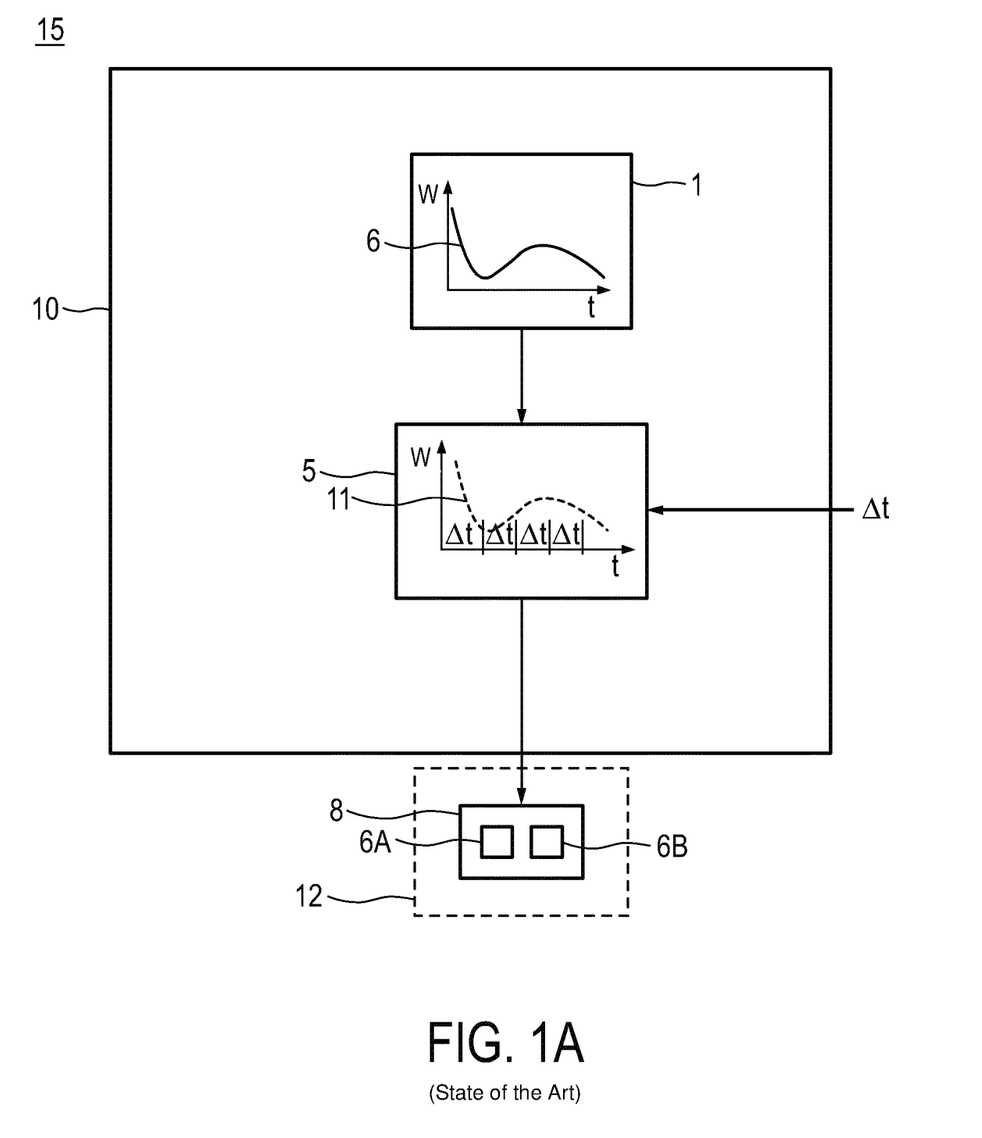
FIG. 1A is a technical system with a control device according to the state of the art, for controlling same or for controlling the components of the technical system by way of control units, considering a marginal condition in the form of a forecast curve.

FIG. 1A shows an arrangement 15 with a control device 10 for controlling a technical system 12 which is shown schematically in the current example and is representative for a wide range of technical systems.

Technical system 12 is explained herein by way of a representative example in the form of a generally known energy supply network. It is known that a technical system 12 in the embodiment of an energy supply network includes an energy provider 6A or an energy consumer 6B as a component 8.

In another embodiment which is not shown here, a technical system 12 may for example be a drive system, such as a drive system for a ship or a drive system for a rail vehicle. Even such a technical system 12 may have a complex arrangement of a number of components 8, to each of which a control unit may be assigned.

It is the purpose of such a control device 10 to control a technical system 12, inter alia with regard to a target value by taking into account a known or currently postulated and communicated forecast curve 6.

Control device 10 for the control of technical system 12 as shown in FIG. 1A includes a receiving unit 1, specifically for forecast curve 6, and a number of control units which are not shown here of one or more components 8 of technical system 12, for example control units for the above mentioned components 8 as energy providers 6A or energy consumers 6B in the energy supply network.

For handling and communication of forecast curve 6 in control device 10, said forecast curve is discretized by way of equidistant time intervals $\Delta t$ to an approximated forecast curve 11; this is symbolically represented in discretization unit 5 of control device 10.

Provided forecast curve 6 in the form of a progression of values W for points in time t in a future time period is provided by a receiving unit 1, and the component is controllable on the basis of an approximated forecast curve 11. With a discretization unit 5 a number of supporting points are selected for the forecast curve, in order to approximate the forecast curve and in order to specify forecast curve 11 approximated by way of the discretization.

The forecast curve is for example a curve of values for power consumption or an emission as a function of time, and the component is an energy producing or consuming component or an emission producing component. A change in the weather can also influence the energy producing or consuming component and is therefore related to the component.

Figure 1B:
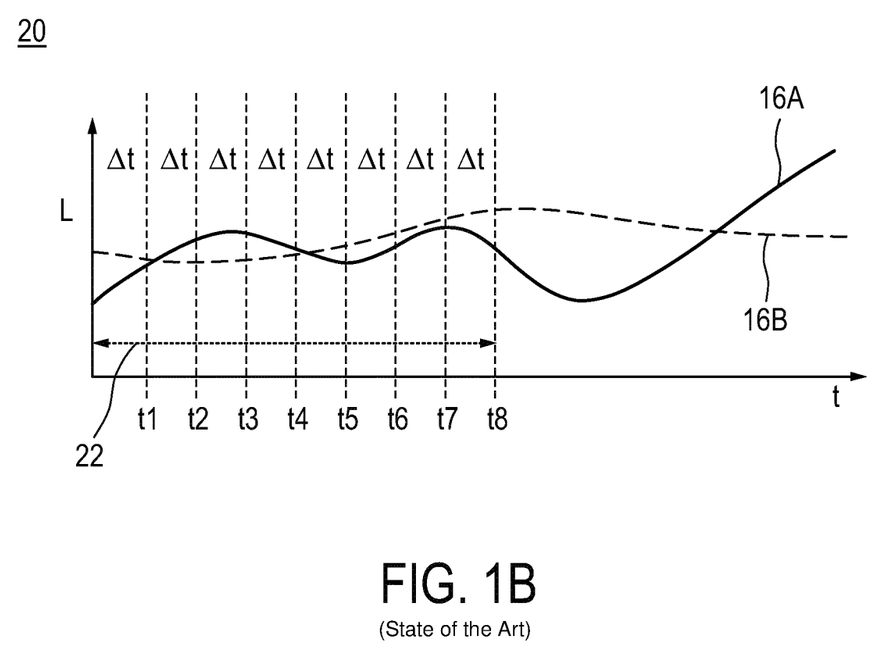
FIG. 1B is a specific example of a forecast curve with a time curve/progression of a forecast, wherein the forecast curve is used as an approximated forecast curve, specifically with an approximation of the progression of the forecast according to the state of the art as a result of a discretization by way of equidistant time intervals to the forecast curve.

Control device 10 controls energy supply system 12, for example, with respect to a target value, which is shown here in FIG. 1B as a solid line in the form of power supplied by energy provider 16A into energy supply network 12 and in the form of power withdrawn by energy consumer 16B from energy supply network 12; the power supplied by energy provider 16A and the power withdrawn by energy consumer 16B are controlled by control device 10 by taking into account forecast curve 6. As explained with FIG. 1A, forecast curve 6 is provided to discretization unit 5 by receiving unit 1. In the current example, forecast curve 6 is provided in the form of a values curve W for power output and power feed to technical system 12 in the embodiment of the energy supply system for points in time t in a future time period.

Discretization unit 5 normally determines a number of supporting points (W, t) for forecast curve 6 in order to approximate forecast curve 6, namely in that forecast curve 6 is discretized to an approximated forecast curve 11 by way of equidistant time intervals Δt.

Discretization unit 5 receives time steps Δt—which are fixed and equidistant—for approximation of the forecast curve and specifies approximated forecast curve 11 with supporting points (W, t) which are selected with these fixed and equidistant time steps Δt for points in time t of supporting points (W, t). Energy provider 6A and energy consumer 6B are thus controllable by control unit 10 on the basis of approximated forecast curve 11, wherein said approximated forecast curve 11, in particular wherein approximated forecast curve can be transferred to the control units respectively of components 8 of technical system 12.

As an example of an approximated forecast curve 11 according to the state of the art, FIG. 1B shows an exemplary time curve 20 of values W for the specified power output to an energy consumer 16B and for the power feed of an energy provider 16A. The embodiment in FIG. 1B shows as an example a forecast curve of an output L of an energy provider 16A and a forecast curve of an output L of an energy consumer 16B as a function of time t.

In another embodiment not shown here, the forecast curve can for example show an emission specification as a function of time.

An approximation of a time curve 20 of a forecast occurs herein in that a forecast horizon 22 is divided into the aforementioned fixed and equidistant selected time steps Δt. Discretization unit 5 which was already described in FIG. 1A can perform said approximation of forecast curve 6 into an approximated forecast curve 11 within the scope of discretization explained above.

Within the framework of system 15, control device 10 for controlling technical system 12—as described in FIG. 1A—can thus be used to control a power output to energy consumer 16B and a feed into energy provider 16A, taking into account forecast curve 6 of output L by energy provider 6A and forecast curve 6 of output L of energy consumer 6B. The output is provided by a progression of values for output L in an energy supply system for eight points in time t1, . . . , t8 within forecast horizon 22.

Figure 2A:
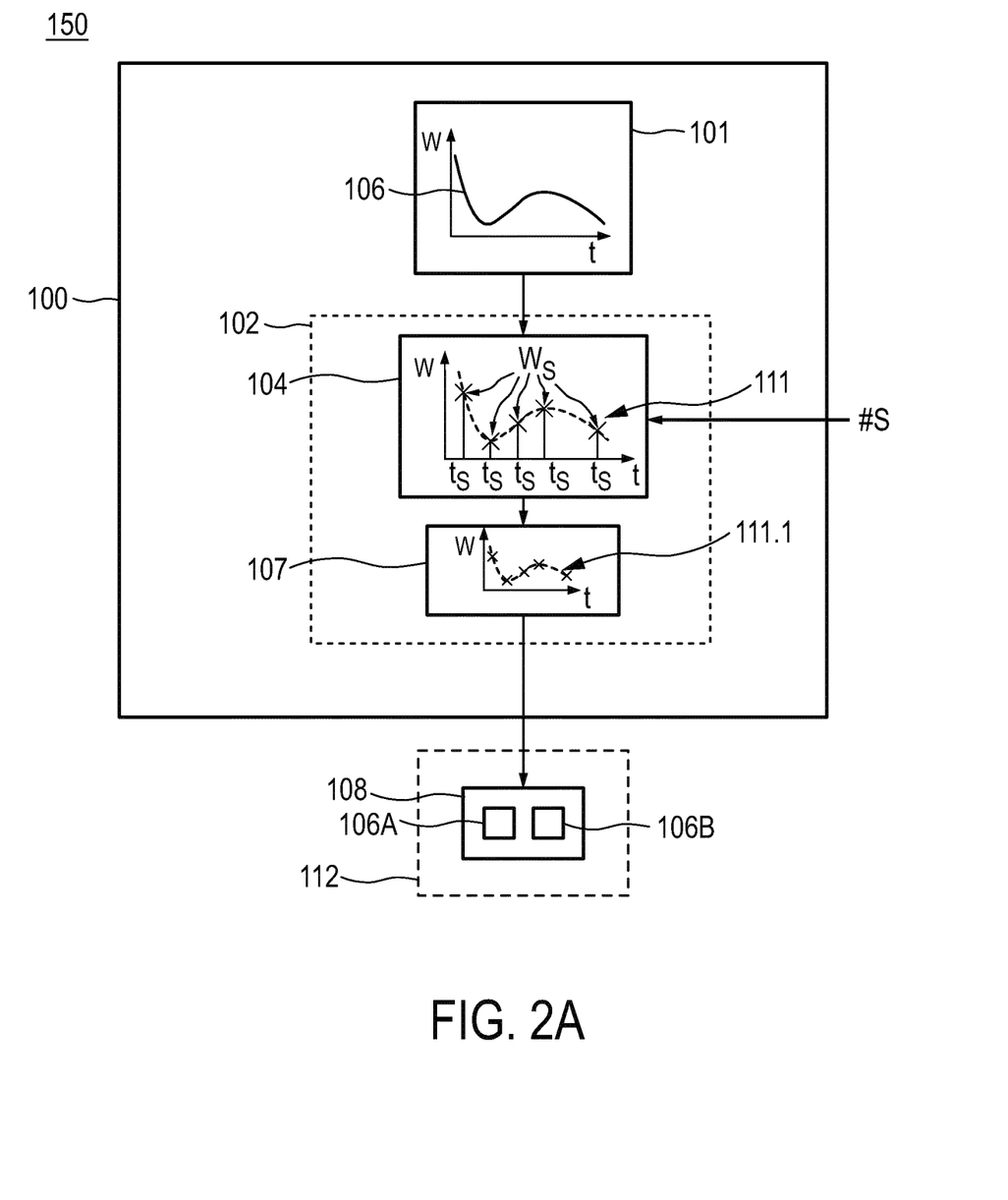
FIG. 2A is a technical system with a control device according to an optional embodiment according to the concept of the present invention for controlling same or for controlling the components of the technical system by way of control units by considering a marginal condition in the form of a forecast curve.

In contrast, FIG. 2A according to the concept of the present invention shows within the framework of an optional embodiment, however also in exemplary form, an arrangement 150 with a control unit 100 for controlling a technical system 112. Arrangement 150 in FIG. 2A also has a receiving unit 101 and a number of control units which are not shown in detail, and which are used analogously to the ones already described in FIG. 1A. In other words, control device 100 also serves in this case to control technical system 112 and includes a receiving unit 101, inter alia, for forecast curve 106, and a number of control units (not shown in detail) of one or several components 108, of technical system 112, for example the aforementioned components 108 as an energy provider 106A or as an energy consumer 106B in the energy supply network. For structural elements which are known already from FIG. 1A, the same reference number are used in the representations in FIG. 2A for reasons of clarity. The following description is limited to the explanation of the differences compared with the embodiment according to the state of the art in FIG. 1A.

For handling and communication of forecast curve 106 in control unit 100 this forecast curve 106 is converted in an improved manner to an approximated forecast curve 111, namely by way of optimizer 102 with is symbolically illustrated in FIG. 2A. This is symbolically recognizable in optimizer 102 of control device 100 and is explained below.

Arrangement 150 according to the optional embodiment in FIG. 2A differs from arrangement 15 in FIG. 1A in regard to the aforementioned optimizer 102 which includes an analysis unit 104 and an approximator 107. Analysis unit 104 is designed to set supporting points (Ws, ts) (each of which can also be written as Ws, ts, respectively) on the basis of forecast curve 106 within the scope of control device 100. In the current example, analysis unit 104 sets a number of #S set supporting points (Ws, ts) which are respectively determined by a characteristic value Ws and a point in time ts.

A number #S of supporting points (Ws, ts) are illustrated herein as #S=5. In other design examples the number #S of supporting points (Ws, ts) can of course be selected as any desired number #S, depending on an acceptable computing effort. However, the number of supporting points #S should be selected so that a computing effort remains well within the scope of control device 100, especially in the case of a real-time application.

Analysis unit 104 of control device 100 can select characteristic values Ws of forecast curve 106 for example at minima, maxima or turning points of forecast curve 106. Minima, Maxima and turning points can be determined especially easily within the scope of a curve discussion of forecast curve 106. This means that, according to the concept of the invention—as shown by way of example in this embodiment—the graphic form of provided forecast curve 106 (in other words the progression of the forecast itself) serves to advantageously select supporting points Ws, ts. In other design examples, other points to be determined in the forecast curve can also be selected for characteristic values Ws of forecast curve 106, such as zeros or interfaces with other forecast curves, or the like. In any case, however, according to the concept of the present invention—other than in the state of the art wherein the supporting points are selected with the same time intervals, and thus the shape of the forecast curve is not taken into account— the shape of the provided forecast curve 106, that is the curve of the forecast itself, influences the selection of supporting points Ws, ts. Especially significant for control device 100 of a technical system 112— in the current example in the embodiment of an energy supply network with energy provider 106A and energy consumer 106B as components 108— are selected points in time ts, at which forecast curve 106 develops characteristically in its progression; most of the time this correlates with significant events at or for a component 108 of technical system 112.

For a technical system 112—in the current example in the embodiment of an energy supply network with energy provider 106A and energy consumer 106B as components 108—it is therefore significant if an especially large number of energy consumers 106B draw power from the network— as selected points in time ts such points in time t can be selected at which forecast curve 106 of energy consumers 106B increases sharply. Also, many energy consumers 106B may cease to draw power from the network; selected points in time ts can therefore be those at which energy consumer 106B drops sharply. Especially significant are also points in time ts at which energy providers 106A supply less power into the energy supply network; selected points in time ts can then be selected to be those at which progress curve 106 of energy providers 106A drops sharply.

In general, not only events are significant for the control which are recognized by changes in the forecast curve in the form of minima, maxima and turning points or gradients, of changes in gradients, but those which correlate with significant events at or for a component 108 of technical system 112. With characteristic points in time ts a supporting point (Ws, ts) is then set according to the concept of the present invention, by way of which—in contrast to the previously explained approximated forecast curve 111— a supporting point optimized forecast curve 111.1 is determined.

Approximator 107 of an optional embodiment is thus designed according to the concept of the present invention to specify through use of the set supporting points (Ws, ts) of analysis unit 104 an approximated forecast curve 111 as a supporting point optimized forecast curve 111.1.

Approximator 107 can call analysis unit 104 at regular time intervals—for example at regular intervals in the range of 5 seconds or the like—to set supporting points (Ws, ts). In other embodiments, analysis unit 104 can of course be called depending on reasonable computational effort at shorter or longer time intervals, for example in 1, 2 or 10 seconds for setting of support points.

By calling analysis unit 104 at regular time intervals, the supporting points (Ws, ts) can be specified with an updated analysis, at least in the event that changes occur in forecast curve 106 within such a time interval—for example, if forecast curve 106 changes due to a changed weather forecast. This means that, for a changing forecast curve 106 dynamically updated, set supporting points (Ws, ts) are specified with an updated analysis; set supporting points (Ws, ts) are therefore optimized in an updated manner for changing forecast curve 106 by calling up analysis unit 104 at regular time intervals.

A forecast curve 111 approximated with the set supporting points (Ws, ts), optionally by way of an updated analysis, is then transferred as the said supporting point optimized forecast curve 111.1 of one or more control units of control device 100 of technical system 112—in this case for controlling energy providers 106A and energy consumers 106B.

FIG. 2B illustrates again by way of an example and in principle a time curve 200 of a projection of values W for the specified power output to an energy consumer 116B and for the energy feed of an energy provider 116A as a function of time t, namely a forecast curve 106 of a power L of an energy provider 106A and a forecast curve 106 of a power L of an energy consumer 106B as a function of time t—in this case this corresponds to an explained supporting point optimized forecast curve 111.1 according to an optional embodiment according to the concept of the present invention, as explained by drawing FIG. 2A.

Figure 2B:
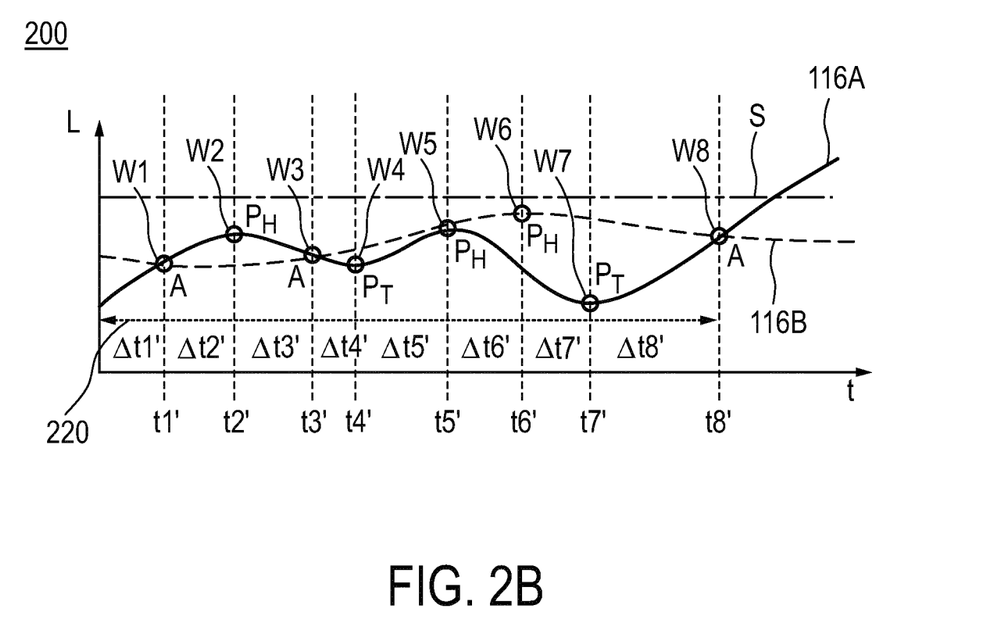
FIG. 2B is a specific example of a forecast curve with a time curve/progression of a forecast, wherein the forecast curve is used as an approximated forecast curve, specifically with an approximation of the curve/progression according to an optional embodiment according to the concept of the present invention.

In particular, in contrast to the approximation described in FIG. 1B in the approximation in FIG. 2B an approximation is shown of the forecast curve of power L, wherein the selected points in time ts of the set supporting points (Ws, ts)—in the current example eight time points ts=t1', ... t8'—have variable time intervals Δt1' ... Δt8'. In addition, due to variable and sometimes greater time intervals Δt1' ... Δt8' approximation occurs in the embodiment shown in FIG. 2B in regard to an extended forecast horizon 220, compared to the described approximation in the embodiment shown in FIG. 1B. For example, time interval Δt8'—as is the case between characteristic time points 17' and 18'—is greater here than time intervals Δt in the example from the state of the art in FIG. 1A. Overall, the extended forecast horizon 220 is thus further in the future.

It is however important that, when selecting minima, maxima and interfaces as values Ws for supporting points (Ws, ts) there is no guarantee that a longer prediction horizon will result. If, for example, time intervals Δt would be longer in the embodiment example in FIG. 1B, a longer prediction horizon would result.

However, an approximation of supporting point optimized forecast curve 111.1 in regard to the thus extended forecast horizon 220 is not inevitable.

Nevertheless, characteristic points in time ts can have closer time intervals Δt' as is the case in the embodiment in FIG. 2B between the characteristic time points t3' and t4' which are closer to one another; these characteristic points in time $t_S$ at closer variable time intervals Δt' allow a more precise approximation than the fixed and equidistant selected time intervals Δt which are described in FIG. 1B.

In contrast to the described approximation in FIG. 1B, the selection of minima, maxima and interfaces as supporting points provides however a simple possibility for better approximation of the forecast curve, that is, the mean quadratic error is smaller here than in the choice of equidistant supporting points.

The pair of characteristic values W1, ..., W8 and selected time point t1', ... t8' determine the set supporting points (Ws, ts).

Characteristic values Ws of the set supporting points (Ws, ts)—in the present case W1, ..., W8—can be determined by a curve discussion of the forecast curve of power L. In the current example, characteristic values Ws are selected from the following group: minima $P_T$, maxima $P_H$ and interfaces A of the forecast curves of the energy provider and the energy consumer. In other design examples turning points and zero passes of the forecast curve or threshold values S can also be selected. Regardless of a curve discussion, such supporting points (Ws, ts) can also be selected that correlate with significant events or for a component of the technical system; they may for example be specified at random or by way of signaling.

An arrangement 150 of the embodiment in FIG. 2A can, by taking into account the forecast curve of power L of energy provider 106A and of forecast curve of power L in an energy supply system, as an example of a technical system 112 for characteristic time points $t_S$—presently eight time points t1', ..., t8' in the extended forecast horizon 220—control a power output to energy consumer 116B and a power feed of energy provider 116A in an improved manner by way of the explained control device 100.

Figure 3:
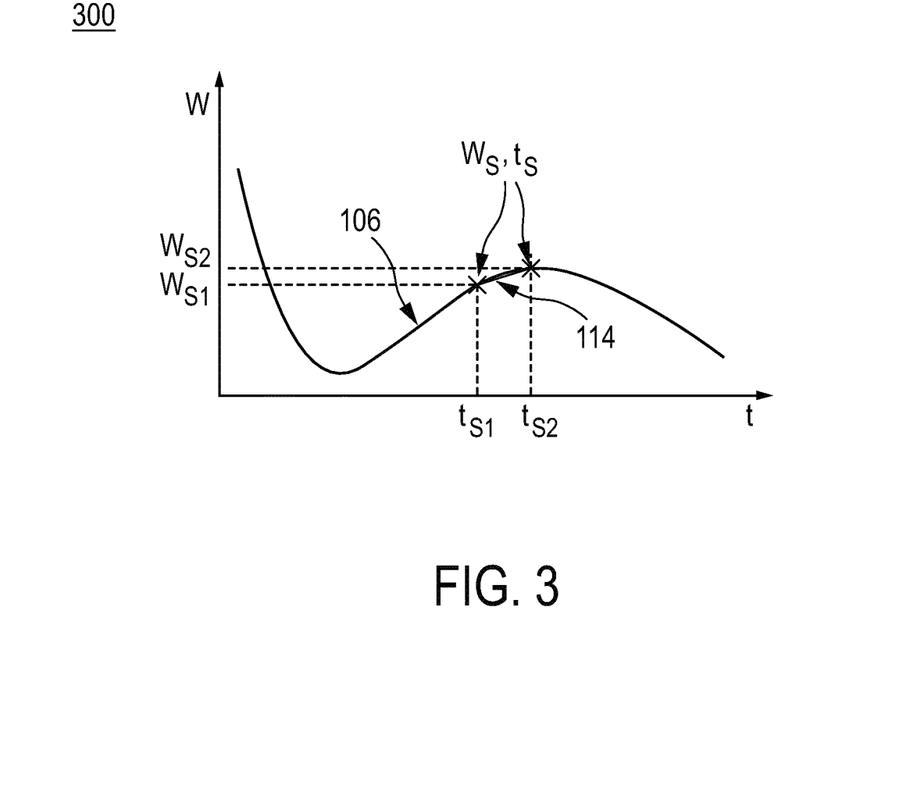
FIG. 3 is an example of a linear interpolation to represent an approximated forecast curve according to an additional optional embodiment according to the concept of the present invention.

FIG. 3 shows schematically how a linear interpolation 300 of a forecast curve 106 in the form of a curve of values W as a function of time t can be used advantageously within the concept of an optional embodiment according to the concept of the present invention. In the linear interpolation 300 it is provided that respectively between two set supporting points ((Ws1, ts1); (Ws2, ts2)) forecast curve 106 is linearly interpolated, specifically with an interpolation line 300. The determination of characteristic values $W_{S1}$, $W_{S2}$ can occur with the associated characteristic time points $t_{S1}$, $t_{S2}$ in such a way that the deviation between the curve of forecast curve 106 and approximation 114 is minimized; this can be implemented for example, within the scope of a method of the smallest error square. A set of interpolation lines is determined for the curve of forecast curve 106 in such a way that it progresses as closely as possible to the data points of forecast curve 106 and thus summarizes the curve of forecast curve 106 as best as possible, specifically while minimizing the distance variances.

Figure 4:
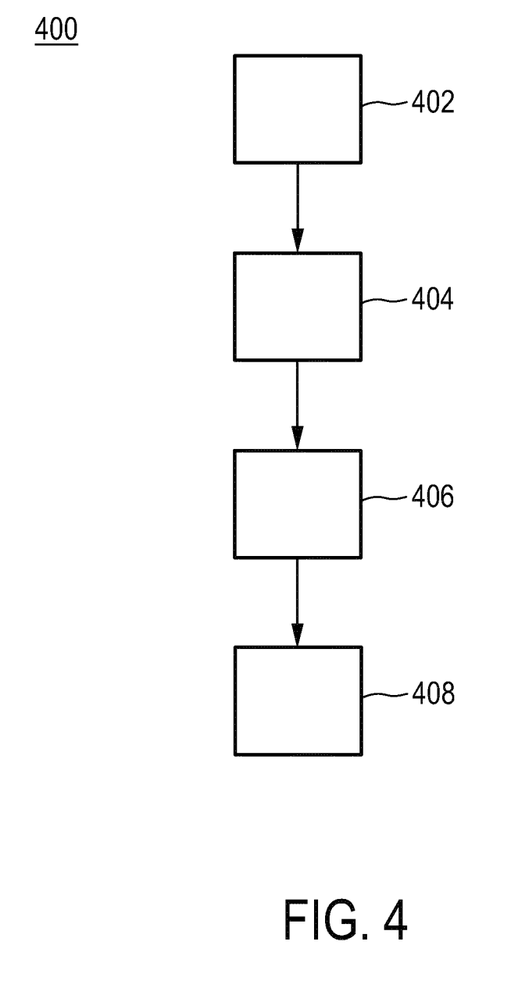
FIG. 4 is a method for operating a control device for controlling a technical system, as shown in FIG. 2A and FIG. 2B and FIG. 3, according to an optional embodiment according to the concept of the present invention, Corresponding reference characters indicate corresponding parts throughout the several views. The exemplifications set out herein illustrate embodiments of the invention, and such exemplifications are not to be construed as limiting the scope of the invention in any manner.

FIG. 4 shows a flow chart for explanation of a method 400 for operating a control device 100 for controlling a technical system 100 with a number of components 108 according to one optional embodiment according to the concept of the present invention. Technical system 112 is controlled with method 400 with respect to a target value and by taking into consideration a forecast curve 106. Component 108 is controllable on the basis of an approximated forecast curve 111.

In a first step 402, forecast curve 106 in the form of a curve of values W is received by a receiving unit 101 in a future time period.

In a second step 404, a number of supporting points W, t for forecast curve 106 is determined, in order to approximate prognosis curve 106. According to the concept of the present invention, supporting points (Ws, ts) are set on the basis of forecast curve 106 with the assistance of a pair of characteristic values Ws and time points ts. This means that an analysis unit 104 is initially designed to set supporting points (Ws, ts) on the basis of forecast curve 106.

In the present case it is provided that approximated forecast curve 111 is specified in a third step 406 with supporting points (Ws, ts) as a supporting point optimized forecast curve 111.1. An approximator 107 is designed to specify with the set supporting points (Ws, ts) the approximated forecast curve 111 as a supporting point optimized forecast curve 111.1.

In a fourth step 408 component 108 is controlled on the basis of the approximated forecast curve.

COMPONENT IDENTIFICATION LISTING

1 Receiving unit (state of the art)
5 discretization unit
6 forecast curve
6A energy provider as an exemplary part of a component 8
6B energy consumer as an exemplary part of a component 8
8 component of the technical system
10 control device (state of the art)
11 approximated forecast curve
12 technical system
16A power feed to an energy provider as a function of time
16B power output to an energy consumer as a function of time
20 time curve of the forecast
22 forecast horizon
100 control device (optional embodiment according to the concept of the present invention)
101 receiving unit
102 optimizer
104 analysis unit
106 forecast curve
106A energy provider as exemplary part of a component 108
106B energy consumer as exemplary part of a component 108
107 approximator
108 component of the technical system
111 approximated forecast curve on the basis of forecast curve 106
111.1 supporting point optimized forecast curve
112 technical system
114 approximator
116A power feed to an energy provider as a function of time
116B power output to an energy consumer as a function of time
150' arrangement (state of the art)
150 arrangement (optional embodiment according to the concept of the present invention)
200 time curve of the forecast
220 extended forecast horizon
300 linear interpolation
400 method
402 receiving
404 determining
406 specifying
408 controlling
A interface
L system characteristic
$P_H$ maxima
$P_T$ minima
$t_1 \ldots t_8, t_1' \ldots t_8'$ time points
W value
W, t supporting points
$W_S$ characteristic value
$(W_S, t_S)$ set supporting points
$\Delta t$ equidistant time intervals
$\Delta t1', \ldots \Delta t8'$ variable time intervals
S number of supporting points
S threshold value While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a technical system with respect to a target variable by taking into consideration a forecast curve, the method comprising the steps of:

receiving the forecast curve with a plurality of values for a plurality of points in time in a future time period;

determining a plurality of supporting points for the forecast curve in order to approximate the forecast curve, the plurality of supporting points being set based on analyzed ones of the plurality of values of the forecast curve;

specifying an approximated forecast curve with the plurality of supporting points, the approximated forecast curve being indicated with the plurality of supporting points which are set based on analyzed ones of the plurality of values of the forecast curve, the approximated forecast curve being specified as a supporting point optimized forecast curve;

determining a plurality of characteristic values of the forecast curve based on the analyzed ones of the plurality of values;

selecting the plurality of points in time for the plurality of characteristic values of the forecast curve for which the plurality of supporting points are set, the plurality of characteristic values being selected in such a way (i) that any deviations between the forecast curve and the approximated forecast curve in a form of the supporting point optimized forecast curve are minimized, and (ii) that by way of a method of a smallest error squares a distance measure is minimized, the distance measure being between the forecast curve and the supporting point optimized forecast curve with a linear interpolation of the forecast curve; and controlling at least one controllable component based on the approximated forecast curve.

* * * * *